(12) United States Patent
Tiller et al.

(10) Patent No.: US 7,798,403 B2
(45) Date of Patent: Sep. 21, 2010

(54) ITEM CARRYING AT LEAST TWO DATA STORAGE ELEMENTS

(75) Inventors: Thomas Tiller, Bussigny (CH); Olivier Rozumek, Le Pâquier-Montbarry (CH)

(73) Assignee: SICPA Holding S.A., Prilly (CH)

( * ) Notice: Subject to any disclaimer, the term of this patent is extended or adjusted under 35 U.S.C. 154(b) by 846 days.

(21) Appl. No.: 11/570,258

(22) PCT Filed: Jun. 1, 2005

(86) PCT No.: PCT/EP2005/052497
§ 371 (c)(1),
(2), (4) Date: Dec. 14, 2006

(87) PCT Pub. No.: WO2005/124673
PCT Pub. Date: Dec. 29, 2005

(65) Prior Publication Data
US 2008/0272886 A1    Nov. 6, 2008

(30) Foreign Application Priority Data
Jun. 18, 2004    (EP) ................................ 04014303

(51) Int. Cl.
*G06K 7/08*    (2006.01)
(52) U.S. Cl. .................. 235/451; 235/494; 235/380
(58) Field of Classification Search .............. 235/487, 235/494, 381, 380, 375, 383, 451
See application file for complete search history.

(56) References Cited

U.S. PATENT DOCUMENTS

| | | | |
|---|---|---|---|
| 4,538,059 A | 8/1985 | Rudland | |
| 5,401,960 A | 3/1995 | Fisun et al. | |
| 5,762,377 A | 6/1998 | Chamberlain | |
| 6,260,761 B1 * | 7/2001 | Peoples, Jr. ............ | 235/462.07 |
| 6,593,853 B1 | 7/2003 | Barrett et al. | |
| 2001/0029857 A1 | 10/2001 | Heredia et al. | |
| 2002/0011519 A1 | 1/2002 | Shults, III | |
| 2002/0080994 A1 | 6/2002 | Lofgren et al. | |
| 2004/0005418 A1 | 1/2004 | Schmid et al. | |
| 2004/0066273 A1 | 4/2004 | Cortina et al. | |

FOREIGN PATENT DOCUMENTS

| | | |
|---|---|---|
| DE | 4241663 | 6/1994 |
| DE | 29912500 | 2/2000 |
| DE | 20301463 | 7/2003 |
| EP | 1231562 | 8/2002 |
| JP | 2003186377 | 7/2003 |
| WO | 00/46734 | 8/2000 |
| WO | 02/35463 | 5/2002 |

* cited by examiner

*Primary Examiner*—Karl D. Frech
(74) *Attorney, Agent, or Firm*—Shoemaker and Mattare

(57) ABSTRACT

An item according to the invention comprises at least two data storage elements such as e.g. an RFID transponder 2 and a barcode 5, wherein the latter is non-visible for the unaided human eye and comprises coded information. The invention allows for a backup of information between the two data storage elements, in order to prevent inadvertent or malicious data loss. Further aspects of the invention are related to the interdependent or the cooperative use of both storage elements in the framework of a product security tracking and tracing scheme.

13 Claims, 2 Drawing Sheets

ITEM CARRYING AT LEAST TWO DATA STORAGE ELEMENTS

Figure 1:
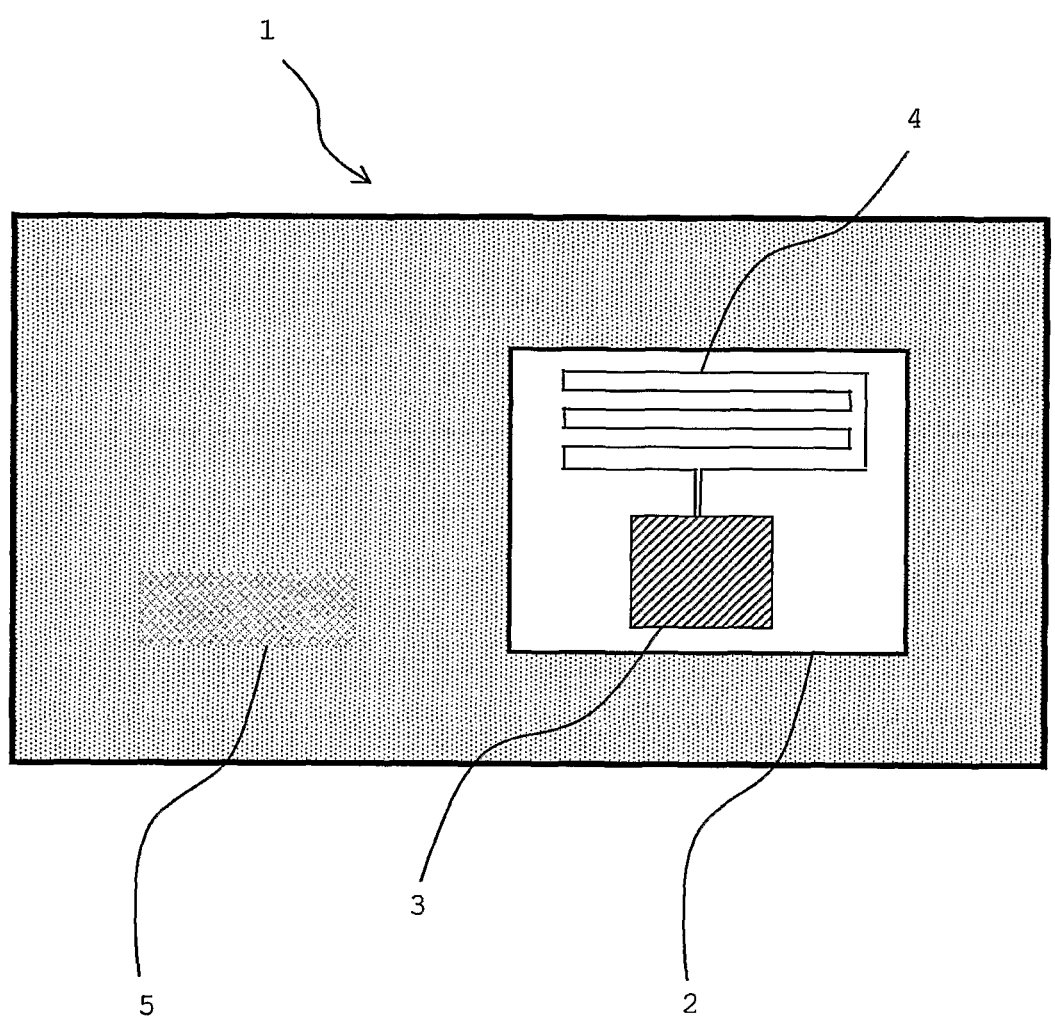

The invention is related to improvements in security and reliability in the field of product tagging, especially for track- and trace applications on goods, items and/or security documents.

Barcodes are commonly used for simple and reliable product markings, such as e.g. the Code EAN (European Article Numbering) or EAN 128, which is also suitable for ASCII-based information. Barcodes are cheap in application—a mere printing—, and easily read and decoded with the help of optic scanning or imaging devices.

For non-critical purposes, e.g. for marking supermarket articles or the like, such barcodes, either one-dimensional (1D) or two-dimensional (2D) are usually applied in a manner to be visible by the unaided eye; read-out is usually performed by scanners working with red or near infrared (NIR) illumination, for reasons of better contrast and commercial availability of low cost laser diodes. Electronic CCD or CMOS camera systems are also increasingly used in such applications.

For purposes, which require a higher level of security, however, coded information, such as barcodes, can be applied to items in a form, which is non-visible to the unaided human eye without the help of specific illumination and/or detection devices. Inks comprising UV- or IR-active dyes are known in the art and, e.g., described in U.S. Pat. No. 5,755,860, U.S. Pat. No. 5,684,069 and EP 0 663 429. It is to be understood that, in the context of the present invention, UV- or IR-active dyes shall comprise both, UV- or IR-luminescent, as well as UV- or IR-absorptive dyes. Such non-visible, coded information can be used in product tracking and tracing applications, as well as on banknotes, security papers, e.g., identity documents or credit cards, or on articles of any-kind.

A major disadvantage of barcodes, either of the visible or of the non-visible type, is their limited storage capacity, which is not sufficient for certain purposes. Moreover, in given cases, the addition of further information would be desirable after the application of the barcode. However, no information can be added to an existing barcode; only a further barcode might be applied for this purpose. Finally, barcodes can become unreadable through partial surface damage by abrasion (scratches) or by the attack of solvents or other liquid products. To cope with this problem, a sufficient redundancy of the printed information must be generally provided.

In a different approach, a radio-signal based product labeling, commonly referred to as Radio Frequency Identification (RFID) is known. An RFID system requires the article to be labeled with a ^transponder', i.e. an electronic circuit, implemented as a silicon microchip, which is connected to an antenna. The said antenna may be, depending upon the operation frequency, a wire coil, a closed metal loop comprising one or several turns, or an open-ended dipole antenna. The said electronic circuit comprises memory means with stored information therein. The said RFID system further comprises at least one reader device, able to interact with the transponder and to read or write information from or to said memory means. Distinction is made between active transponders having their own power source (which must be maintained), and passive transponders without an own power source.

In the reading/writing process of a passive transponder, the transponder is supplied with energy by a Radio frequency (RF) field from the reader device, thus rendering the transponder autonomous and maintenance-free. Transponders with extended memory means allow for a larger amount of data to be stored than is possible via conventional barcodes; moreover, the addition of further information or the modification of already stored information is equally possible in a transponder designed for such purposes. Further advantages of transponders over barcodes include the more extended range of coverage for the read-out (which depends, among other factors, from the set-up of the reader device and the frequency of the RF field), as well as the possibility of being readable through a large variety of optically opaque materials, as long as they are not electrically conductive or otherwise strong RF-absorbers.

On the other hand, a major drawback of RFID-transponders is their rather high sensitivity to adverse environment influences, such, as e.g. intense electromagnetic fields which, can electrically destroy the circuit on the microchip, as well as excessive heat, chemical attack, or mechanical breakage. The mechanical resistance of the RFID transponder assembly is often rather low; in particular, the connections between the microchip and the antenna are prone to breakage. A breakage event impedes the further read-out of the data in the microchip by ordinary means, or even causes complete loss (destruction) of the data.

Consequently, a major drawback of the sole use of RFID transponders is that a complete loss of information due to the inadvertent or intentional destruction of the transponder may occur. A further weakness of the sole use of transponders is that, upon an accidental breakdown of an element in the electronic back-logistics (server, data transfer link, network, power grid), no article codes can yet be assessed. A robust transponder-based coding system relies on second, parallel way of information back up, i.e. the non-electronic duplication of the most important part of the information stored in the transponder on a second location of the article.

The German Utility Model DE 203 01 463 U1 describes the combination of a barcode and a transponder in general terms. The transponder is intended to enhance the security of the barcode and to allow for a rapid machine processing. However, the approach disclosed therein has drawbacks in a security oriented context, where an intentional removal of information is feared: first, the barcodes are applied to labels or directly to the RFID-transponder; thus, the barcode is either obvious as a label and may be maliciously removed, or the barcode on the RFID label is lost together with the RFID-transponder, if the transponder is e.g. maliciously removed or destroyed. Second, the barcodes themselves are printed in visible, thus rendering the existence and location of the backup information obvious.

It is an object of the present invention to overcome the drawbacks of the prior art, in particular to improve the security of information provided on an item. It is a further object of the invention to provide a security feature which allows for a maximum of security and flexibility of the handling of information stored thereon, to prevent irrecoverable loss of data, and to provide a more secure pathway of access to sensitive information. Further objects of the present invention will become apparent from the description and the independent claims.

These objects are particularly met by an item equipped with at least two data storage elements according to claim 1 and, related thereto, further independent use- and process claims.

An item according to the invention is equipped with at least two data storage elements, wherein the said first data storage element comprises an RFID-transponder and the said second data storage element comprises a preferably printed code, which is at least in part non-visible to the unaided human eye.

According to especially preferred embodiments of the present invention, said item is a consumer good, such as e.g. a bottle, jar, vial, can, box, pack, carton, blister, bag, garment, spare part, etc. The invention especially offers advantageous track-and-trace features to such consumer goods, which could not be achieved otherwise.

Most preferably, the first data storage element is provided on the item via an adhesive label, preferably on the backside of an adhesive label.

For the purpose of this invention, an RFID-transponder is to be understood as a microelectronic data storage device which can be remotely read or written via a radio-frequency (RF) interrogation device. The transponder of the said first data storage element may be applied to the item either as such, or preferably non-obviously embedded into capsules, inlays, foils or the like. The various approaches of attaching/embedding transponders to different items are e.g. reviewed in (a) "RFID Handbook: Fundamentals and Applications in Contactless Smart Cards"; and (b) "RFID Handbuch: Grundlagen und praktische Anwendungen induktiver Funkanlagen, Transponder und kontaktloser Chipkarten", both by Klaus Finkenzeller (author), Hanser Fachbuchverlag. Concerning the various approaches of attaching/embedding transponders, the disclosure of this document is herewith explicitly incorporated.

Preferably, the second data storage element, comprises a printed code, e.g. a ID- or, most preferably, a 2D-code such as barcodes, stacked (bar) codes or matrix codes, which is non-visible to the unaided eye. For special applications, e.g. when the barcode is not needed or wanted to be completely hidden to the unaided eye, combined codes comprising visible and non-visible section may advantageously be applied. A preferred 2D-code is e.g. DataMatrix, a 2D-matrix code specified by the standards ANSI/AIM BCll-1997 and ISO/IEC 16022. Through data redundancy and an error correction such codes as e.g. the ECC-200 from RVSI (Robotic Vision Systems, Inc.), allow for the recognition of codes, which are significantly damaged. The said codes are preferably printed, e.g. by inkjet printing, using e.g. single nozzle continuous printers, such as the Domino® A-series, Linx 6200, Videojet Excel and Ipro, or by thermal printing systems, such as the IBM 4400, Kodak 8660 or Zebra 110 series, or by toner printing processes, such as laser printing, using e.g. HP Color LaserJet.

Most preferably, the second data storage element is applied directly onto the item, circumventing herewith the use of additional labels or the like, which might easily be scratched or pealed off, either accidentally or maliciously. In case of the RFID-transponder being maliciously destroyed, the information stored in the second data storage element, e.g. the non-visible code, remains still available for off-line processing. Thus, the application of the coded information directly onto the item, in particular in the form of a code, which is non-visible to the unaided eye, further enhances the security of the coded information.

According to an embodiment of the present invention, the second data storage element is applied, preferably by ink-jet or other printing means, directly onto the item, rather than onto the first data storage element. However, the application of the second data storage element onto the first data storage element is not excluded, as it may be the only suitable approach for items which have a too limited surface available to apply both a transponder and a printed code aside each other.

According to another, particularly preferred, embodiment, the coded information, in particular the printed code, is further linked to a material-based security element, which is e.g. provided by specific dyes incorporated into the ink, thermal transfer material or toner used for printing the code. Suitable dyes are absorbing light in particular wavelength areas, preferably outside the visible range of the spectrum, and are preferably re-emitting light under specific illumination. Furthermore they should be applicable at a density such as to appear non-visible to the unaided human eye. In general terms, as non-visibility is aimed for, such dyes might be active, i.e. absorb, emit or be excite-able in the UV range (wavelengths between about 200 nm to about 400 nm) and the near-IR range (wavelengths between about 700 nm to about >1100 nm) or even beyond 1100 nm; however, suitable dyes may also be excited or emit in the visible range (wavelengths between about 400 nm to about 700 nm), as long as they do not significantly absorb in this range. Suitable categories of dyes include, but are not limited to polymethines, cyanines, phenoxazines, phtalo- and naphthalocyanines, terylenes, coumarines, triarylmethanes, squarrylium and croconium derivatives and rare earth complexes. It is particularly preferred that the printed code is applied in a way to not allow a visualization using a commonly available illumination source; commonplace UV-active dyes emitting in the visible range (400 to 700 nm) are accordingly avoided as a non optimal choice, whereas IR-active dyes are preferred. Most preferably, a suitable reader both allows for illumination with a specific range of excitation wavelengths, preferably between 200 and 1100 nm, and possesses detection means sensitive to a specific range of preferred emission wavelengths, preferably between 200 nm and 400 nm, or between 700 nm and 1100 nm.

Preferably, the item according to the invention additionally carries a security marking. Such security marking may e.g. be based on an optically variable ink, magnetic ink, luminescent ink and/or IR absorbing ink. Depending on the intended use of the security marking, it may be either designed non-visible, partially visible or visible to the unaided eye. Preferably, said security marking is applied onto the label carrying the first data storage element, and most preferably serves as an authenticity identifier of said item and/or label. The additional security marking may comprise or consist of a third data storage element, which preferably is at least partially, most preferably completely non-visible to the unaided human eye; moreover, the security marking may serve as an authenticity identifier of said item, preferably independently from said first and said second data storage element.

Another aspect of the present invention is the use of a first and a second data storage element on an item, as mutual backup storage means for information contained in said first and said second data storage element attached to said item. Thus, a barcode may serve as a backup storage means for the information stored in a RFID transponder, or the transponder may serve as a backup storage means for the information encoded by a barcode, respectively. Thus, some of the principal drawbacks of both storage means are herewith overcome: the RFID transponder is e.g. prone to breakdown, with the concomitant loss of data, in strong electromagnetic RF fields, which, in turn, do not harm the printed code. On the other hand, the printed code is not re-editable and has not enough storage capacity for some applications; it can furthermore be accidentally rubbed off, damaged by scratching, or washed off by solvents; such environmental influences however do usually less harm the RFID transponder.

Even if it is possible to apply the second data storage element onto the first data storage element, e.g. a barcode onto an RFID-transponder, it is preferred for most applications to physically separate both storage means in order to enhance the security of the system: if a transponder and a non-visible barcode are placed on an item at physically distinct locations, a malicious or accidental damage has less probability to hurt both storage means at the same time and to cause a complete loss of the stored data.

A further aspect of the invention is related to a process of applying coded information onto an item 1, comprising the steps of:

at least partially reading out information contained in a first data storage element, preferably comprising an RFID transponder 2 which is attached to the item 1;

based on the read out information, triggering the application of a second data storage element onto said item 1, preferably addressing a printer to apply coded information onto said item 1.

Thus, the process easily allows for addressing a printer to apply a coded information record to the item, said record only-depending on a previously attached RFID-transponder, and preferably a partial read out of information stored in the transponder's memory.

This opens up new possibilities for decentralization: e.g., pre-manufactured RFID transponders can be shipped to a facility where they are attached to articles (items), and, subsequently, the attached transponders will allow for the printing of the said coded information record, independent from further contact to a remote host computer or the like. It is to be understood that the information provided by the RFID transponder and addressing the printer should advantageously be encrypted.

It is further preferred that the coded information record, applied to the item as described above, at least partially comprises information which is already contained in the transponder. Thus, the printed coded information fulfils a backup-function for the most sensitive information which is stored in the transponder, preventing complete loss of data in case of accidental damage, as well as a second security in case of counterfeiting.

A further aspect of the present invention is related to a process of allowing for read-out of secure information on an item comprising two data storage elements, said process comprising the steps of: at least partially reading out information from a first data storage element; based on the read out information, after optional processing of said information, providing access to information contained in a second data storage element.

It is to be understood that within this purpose a printed code may contain necessary information for providing access to information contained in the RFID transponder, or vice versa, that the transponder may contain information for providing access to the information contained in the printed code. Preferably, the initially read out information from one of the data storage elements, e.g. either a printed code or an RFID transponder, provides a means such as a code or a cryptographic key or a supplement to a code or a cryptographic key, or the like, which subsequently allows access to data in the second data storage element.

Within this aspect of the invention, the first data storage element may be designed only as a means for providing access to the second data storage element, without itself containing any further information concerning the marked item at all; or alternatively, such critical information itself, which is stored in one of the data . . . storage elements, might also depend on complement information stored in the other data storage element.

A further aspect of the invention is related to a process of re_assembling secure information on an item carrying two data storage elements, comprising the steps of:

at least partially reading out information from a first data storage element;

at least partially reading out information from a second data storage element;

combining said read out information of said first and said second data storage element, whereby said secure information is re-assembled.

Another aspect of the present invention is related to a process of determining non-authorized manipulations of information contained in a first data storage element, preferably an RFID transponder which is attached to an item, said process comprising the steps of:

determining a verifier, e.g. a message digest or checksum of at least part of the information contained in said first data storage element;

applying a second data storage element onto said item, containing said verifier, e.g. message digest or checksum;

checking for manipulations of information contained in said first data storage element, by comparing the verifier, e.g. the message digest or checksum determined directly from the first data storage element with the verifier, e.g. the message digest or checksum, contained in the second data storage element.

According to this embodiment of the present invention, non-authorized manipulations of information contained in an RFID transponder are easily detected.

A verifier, in the context of the present invention, is to be understood as any set of data derived from the original information, which allows, through the application of an algorithmic data processing scheme, to verify the integrity of the information that was originally stored. A typical example of an elementary verifier is a checksum. A verifier is further to be understood as the verifier itself, as obtained from the algorithmic data processing scheme, or as an encrypted form of said verifier.

Thus, the information contained in an RFID transponder attached to an item can in such a way be checked for non-authorized manipulations. This adds a further level of security to the information on an item.

According to a further embodiment, the invention allows to verify the authenticity of a visible code on an item, in a process comprising the steps of:

storing an indication of said visible code in a first or a second data storage element, preferably an RFID transponder attached or to be attached to said item;

determining the authenticity of said visible code, by comparing the visible code and/or the information contained therein, with the indication of said visible code, contained in said first or second data storage element.

Accordingly, malicious manipulations of commonly applied codes, such as EAN codes, can be easily detected, thus adding a further security aspect to an item protected according to the invention.

The invention will now be further explained by the means of an illustrative example, without the invention to be limited to this specific embodiment.

FIG. 1: item with two data storage elements (barcode and RFID).

Figure 2:
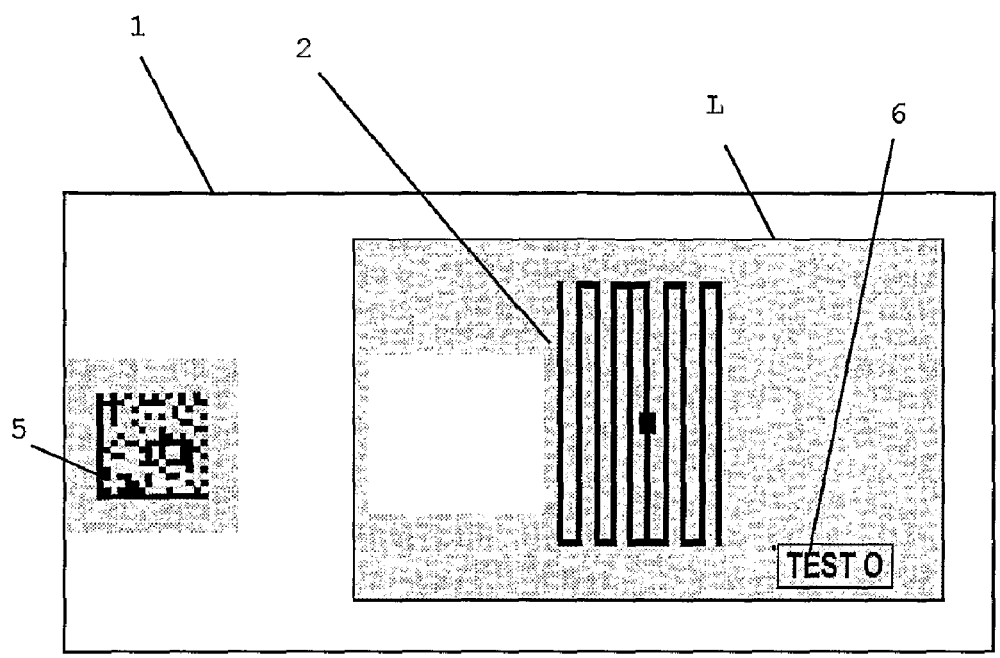

FIG. 2: item with two data storage elements and additional security marking.

FIG. 1 shows an item 1 comprising a first data storage element 2 and a second data storage element 5. The item 1 may be a product to be tracked or traced, e.g. during its life cycle, or a security item such as a banknote, a credit card, an identity document, or the like. According to this exemplary embodiment, data storage element 2 is embodied as a commercially available RFID-transponder, comprising a microchip 3 for processing and storing information and an antenna 4 for providing communication and energy supply in conjunction with an external reader/writer device (not shown). The second data storage element 5 of this embodiment is a barcode, e.g. a 2D-barcode of the DataMatrix type.

Preferably, both the first data storage element 2 and the second data storage element 5 are physically separated from each other, although it is advantageous to arrange them in close proximity, in order to allow for a simultaneous read-out or even e.g. a triggered readout of the barcode by recognition of the transponder by a suitable reader. The barcode 5 is preferably applied (printed) directly onto the item in a form to render it non-visible to the unaided eye, e.g. by the means of a preferably IR-active dye that can be incorporated into the printing ink. Preferably, both, the barcode 5 and the RFID-transponder 2 are applied to the item (or even integrated into the item in case of the transponder 2) such that they virtually do not add to the height of the item 1 . . . b Both the RFID-transponder 2 and/or the barcode 5 may serve as a backup source of information for the other data storage element 2 or 5, respectively. Moreover, the barcode 5 and the transponder 2 may each comprise relevant information for either providing access to the information in the other data storage element 2 or 5, respectively, or for the assembling of complementary information provided from both data storage elements 2 and 5. It is to be understood that access to information stored in both data storage elements 2 and 5 may also be protected by a cryptographic key.

A further practical embodiment of the invention is given in FIG. 2, comprising a product tracking label L (here: a pressure-sensitive bottle label) on an item 1, here a bottle. The label L, of dimensions 42×86 mm, comprises a 900 MHz, Class 0 (read-only), 64 bit RFID tag 2, supplied by MATRICS (now Symbol Technologies Inc., Western Division Sales Office, 555 12th Street, Suite 1850, Oakland, Calif. 94607, United States). The tag consists of a silicon circuit (chip), connected to a meander type flat dipole antenna via a coupling loop (impedance transformer). The tag supports the encoding of a variable, 22-digit alphanumeric code (in the present example: "0X0000C80507A000840CCD").

Further to the RFID tag 2, the item 1 of the present example comprises an invisible, infrared-luminescent 16×16 DataMatrix® code (SICPADATA® mark, 5), printed with a continuous ink-jet printer, wherein the DataMatrix® code is printed directly onto the item, separate from the label.

The SICPADATA® mark exemplarily supports a variable, 16-digit alphanumeric code. In the example, the SICPADATA® mark replicates the last 16 digits of the RFID tag's 22-digit code (i.e. "C80507A000840CCD").

The pressure-sensitive bottle label further comprises at least one additional security marking 6 for overt, semi-covert, and/or covert identification. In the present example, a red-to-green color-shifting ink (SICPASHIFT®, for identification by the unaided eye) is printed in negative on an UV-bi-luminescent background, such that a luminescent writing appears in positive and in different colors upon irradiation with short wave (254 nm) or long wave (360 nm) UV light. The marking 6 here additionally comprise SICPAGUARD®, a machine-readable, covert security element. It is to be noted, that the security marking 6 can be applied, either onto the label (as shown in the example), or directly onto the item.

The label is produced according to the following sequence of operation steps:
(i) Printing and finishing the primary pressure-sensitive label (printing of decorative lay-out with standard inks, eventually printing of security markings with security inks (overt, covert, forensic; static numbering), varnishing, die-cutting, slitting, winding to a reel)
(ii) Applying the RFID tag to the back of the label, inscribing the code into the RFID chip (if not already done at the factory), and verifying the RFID part for code and correct functioning (removing the unreadable labels from the production batch);
(iii) Printing the SICPADATA® mark, verifying and cross _checking it with the RFID code (removing the unreadable or incorrect labels from the production batch).

In a production situation, steps (ii) and (iii) are commonly performed in-line, on one and the same machine. The present exemplary embodiment was realized in the laboratory, where labels with serialized RFID tags already applied, coded and verified, were used. The SICPADATA® marks were applied one-by-one, using an ink-jet print station, followed by a verification and cross-checking of the codes. The label of the present example can be used in a number of different ways; to be noted exemplarily:

1) For the fully automated processing of consumer goods, here bottles (such as medical preparations) carrying the label, the SICPATRACE® electronic code may be exclusively used. The 22-digit alphanumeric information is retrieved for every bottle upon its passage through an RFID gate, and the bottle can then be associated with a determined destination, e.g. upon the automated packaging of medical preparation bottles, the individual codes of the latter are retrieved and stored together with the other packaging and shipping information.

2) For the simple checking of authenticity at the point of sale of the consumer good, here the bottle, the security marking 6 may be used; e.g. the final customer, who purchased a bottle of the medical preparation, can verify the label 6 with e.g. the color-shifting feature, eventually comparing it with the label of a previous bottle he purchased. The end retailer might eventually also want to check the ?V-luminescent feature at the moment he unpacks the bottles.

3) For retail chain inspection, the second data storage element 5 (here: a SICPATRACE® code) and the electronic RFID code are read and compared with the help of a preferably combined detection device, which is able to detect and decode the otherwise invisible dot-matrix code. The retrieved codes may also be cross-linked, on-line or off-line, with the packaging shipping information which was stored at a central location for the corresponding items at the moment of their manufacturing, in order to check for product diversion.

4) In case of incongruent or missing data or security elements, which is strongly indicative of a counterfeit, the SICPAGUARD® machine-readable covert feature of the security marking 6, or any other forensic feature which is naturally present in the label or on the item, or which has been purposely introduced into the label or onto the item, can be used as an ultimate check for evidence, before starting e.g. a legal prosecution.

The invention claimed is:

1. A consumer good carrying at least two data storage elements, wherein a first data storage element is an RFID transponder (2) and a second data storage element is a printed code (5) which is at least partially non-visible to the unaided human eye, and wherein the second data storage element is provided directly on the consumer good, wherein the first data storage element and the second data storage element are placed on the consumer good at physically distinct locations to avoid that malicious or accidental damage simultaneously hurts both data storage elements.

2. A consumer good according to claim 1, wherein the printed code (5) is applied by a method selected from the group consisting of inkjet printing, thermal printing and toner printing.

3. A consumer good according to claim 1, wherein the first data storage element is provided on the consumer good via an adhesive label.

4. A consumer good according to claim 3, wherein the first data storage element is provided on the backside of an adhesive label.

5. A consumer good according to claim 1, wherein said consumer good additionally carries a security marking (6), wherein said security marking (6) serves as an authenticity identifier of said consumer good.

6. A consumer good according to claim 5, wherein said security marking serves as an authenticity identifier of said consumer good independently from said first and said second data storage element.

7. A consumer good according to claim 1, wherein the second data storage element comprises an IR- or UV-active dye, preferably chosen from the group consisting of polymethines, cyanines, phenoxazines, phtalo- and naphthalocyanines, terylenes, coumarines, triarylmethanes, squarylium and croconium derivatives, and rare earth complexes.

8. A consumer good according to claim 1, wherein the second data storage element is or comprises a 1D- or 2D-code.

9. A consumer good according to claim 1, wherein said second data storage element serves as a backup storage means for information contained in said first data storage element attached to said consumer good.

10. A consumer good according to claim 9, wherein said first and second data storage elements are an RFID transponder (2) and a printed code (5), respectively.

11. Process of applying coded information onto a consumer good comprising the steps of:
at least partially reading out information contained in a first data storage element, being an RFID transponder which is attached to the consumer good; and
based on the read out information, triggering the application of a second data storage element onto said consumer good, preferably addressing a printer to apply coded information, onto said consumer good, physically separate from the RFID transponder.

12. Process according to claim 11, wherein the second data storage element applied to the consumer good at least partially comprises information that is already contained in the first data storage element.

13. Process of determining non-authorized manipulations of information contained in a first data storage element being an RFID transponder, which is attached to a consumer good, said process comprising the steps of:
determining a verifier of at least a part of the information contained in said first data storage element;
applying a second data storage element onto said consumer good, containing an indication of said verifier; and
checking for manipulations of the information contained in said first data storage element, by comparing the verifier determined directly from the first data storage element with the indication of the verifier, contained in the second data storage element.

* * * * *